United States Patent
Ehms et al.

(10) Patent No.: US 8,799,187 B2
(45) Date of Patent: Aug. 5, 2014

(54) METHOD FOR TAGGING OF A CONTENT AND A CORRESPONDING SYSTEM

(75) Inventors: Karsten Ehms, Munich (DE); Manfred Langen, Munich (DE); Bernd Lindner, Feldkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 653 days.

(21) Appl. No.: 12/458,245

(22) Filed: Jul. 6, 2009

(65) Prior Publication Data

US 2010/0082508 A1 Apr. 1, 2010

(30) Foreign Application Priority Data

Sep. 26, 2008 (EP) .................................... 08017023

(51) Int. Cl.
*G06F 15/18* (2006.01)

(52) U.S. Cl.
USPC .............................. 706/12; 715/231; 707/103

(58) Field of Classification Search
None
See application file for complete search history.

(56) References Cited

U.S. PATENT DOCUMENTS

| 2007/0033221 A1* | 2/2007 | Copperman et al. ....... 707/103 R |
| 2009/0281970 A1* | 11/2009 | Mika et al. ..................... 706/12 |

* cited by examiner

*Primary Examiner* — Kakali Chaki
*Assistant Examiner* — Luis Sitiriche
(74) *Attorney, Agent, or Firm* — Staas & Halsey LLP (57) ABSTRACT

A method generates tag proposals for tagging of a content, wherein the generating of said tag proposals is performed by combining at least two tag proposing procedures in dependence of a work context of a user. The method can be applied with regard to each area where tagging of contents is desired. By use of the method an effective, computing resource saving, and/or flexible tagging is enabled, by which a sufficient number of tags with high quality can be identified.

14 Claims, 5 Drawing Sheets

METHOD FOR TAGGING OF A CONTENT AND A CORRESPONDING SYSTEM

CROSS REFERENCE TO RELATED APPLICATIONS

This application is based on and hereby claims priority to European Application No. EP08017023 filed on Sep. 26, 2008, the contents of which are hereby incorporated by reference.

BACKGROUND

The present invention refers to a method and a system for generating tag proposals for tagging of a content.

Tagging refers to assigning of significant keywords or meta-data, respectively, to contents, information, or data, respectively, (e.g., images, videos, product specifications, process or event specifications, etc.) available or provided in computing systems or apparatus. In the following, these keywords or meta-data, respectively, are referred to as "tags".

The assigning of tags is usually performed based on subject matter and context of the corresponding content, to which the tags are assigned. Tags can be associated with regard to the whole content or with regard to parts of the content in order to provide an annotation of the content. In this way, efficient content management features such as searching and organization features, for example, are facilitated.

Accordingly, tags may be used to provide an automated mechanism, by which content management can be enhanced and user efforts can be minimized. Additionally, the performance of the apparatus or the system configured for managing of contents is improved in this way.

However, usually tags are standardized dependent upon several factors such as context or subject matter of contents, for example. Thus, tagging of contents or parts of a content that may have, for example, more than one context and/or more than one subject matter becomes rapidly more complicated. This, in turn, leads to a loss of efficiency of tagging and to a loss of performance of the respective content management. Accordingly, also the performance of an apparatus or a system configured for managing of contents by use of tagging decreases. Furthermore, a user typically has limited control of the context and therefore a limited control of the tagging of content items according to desires of the user.

Moreover, tags proposed by known tagging methodologies and to be associated to corresponding contents still lack quality and the required significance to specify the corresponding contents correctly. The known tagging methodologies can be affected or influenced by typographic and/or semantic errors. This leads to a lack of quality of the tags proposed by the known tagging methodologies. Sources of such errors are, for example, orthography (e.g., use of expressions in singular versus use of expressions in plural, upper and lower cases, etc.); use of separators for combinations of words; use of acronyms; use of synonyms (of different words with the same or similar meaning); use of different languages; use of several levels of abstraction of terms; use of homonyms (words with the same or similar spelling and pronunciation but with different meanings).

The lack of quality of tags proposed and assigned to contents is a further factor, leading to an insufficient management of contents and of modules, systems, and apparatus responsible for performing the management of contents.

SUMMARY OF THE INVENTION

One potential object is to provide an improved method of tagging and, thus, improving of the performance of a system provided for content management performed by use of tagging.

The inventors propose a method, the method comprising generating of tag proposals for tagging of a content by combining at least two tag proposing procedures in dependence of a work context of a user.

Here, the tag proposing procedures refer to procedures, which are configured for determining and proposing of tags. Examples of concrete possible arrangements of the tag proposing procedures are provided below with regard to the preferred embodiments of the.

Further, the term work context refers to the environment of the user in which the user works and can specify a plurality of details with regard to this environment, e.g., subject matters at which the user is working at; further users with which the user is communicating; subject matters processed by the further users; contents the user and/or the further users have etc. The term content, in turn, refers as mentioned above to different kinds of information or data, e.g., images, videos, product specifications, process or event specifications, etc.

The combining of at least two tag proposing procedures refers to common appliance or use of the tag proposing procedures for detecting and/or proposing of tags. Here, several ways of combining are possible according to the proposal. Thus, for example, each of the tag proposing procedures can be performed as such. Further, one tag proposing procedure can be performed by use of tag proposals determined and proposed by another tag proposing procedure. Moreover, also methodologies of the tag proposing procedures can be combined. Thus, the proposal allows several implementations of combining and is not restricted to one certain way of combining only. In this way, a flexible implementation of the present invention is possible.

The tag proposals generated can be provided for several purposes, e.g., for processing and/or assigning to a content by the user and/or by a further computing component or module. Thus, the method supports a generic utilization of tags.

In this way, both the quantity and the quality of tags are improved. By use of tags of high quality a more efficient and a more focused tagging is performed, which increases the performance of content management. Accordingly, also the performance of an apparatus or a system configured for managing of contents by use of tagging is improved considerably.

Moreover, determining and proposing of more qualitative or focused tags leads also to a consolidated, coordinated vocabulary of tags, which provides a well structured and significant tag information with regard to several contents of several sources.

Further, the tagging can be implemented and applied in a generic way without restrictions concerning certain operating systems and/or certain applications. The tagging implemented has the same behaviour within different operating systems and applications.

Furthermore, the vocabulary of tags provided can also be incorporated in further applications and/or operating systems without the need of complex modifications of the further applications and/or operating systems and without the need of additional complex implementations.

According to an embodiment, the method comprises evaluating of the work context of the user. In this way, an effective tagging without external support is enabled.

According to an embodiment, the generating of tag proposals comprises:

detecting of a first set of tag proposals by use of a predetermined set of tag proposing procedures;

if the first set of tag proposals is a sparse set of tag proposals, detecting of a second set of tag proposals by use of at least one further tag proposing procedure, which is not comprised in the predetermined set of tag proposing procedures, and adding tag proposals comprised in the second set of tag proposals to the first set of tag proposals; and providing of the first set of tag proposals as the tag proposals for the tagging of the content.

In this way, it is ensured to provide a set of tag proposals having a high quality for tagging of a content.

According to an embodiment, the predetermined set of tag proposing procedures is determined in dependence of the work context of the user.

According to a further embodiment, the at least one further tag proposing procedure is selected in dependence of said work context of said user.

Thus, it is ensured that the current work context of a user is always taken into account when performing said tagging.

According to an embodiment, said method comprises assigning of at least one tag proposal of said tag proposals to said content and storing of said at least one tag proposal, assigned to said content, in a semantic network. Thus, it is ensured that the proposed and subsequently assigned tags are always restorable. Additionally, an effective handling of tags becomes possible in this way.

According to an embodiment, said storing comprises storing for said at least one tag assignment least one of following attributes:

a corresponding tag (i.e., the corresponding tag proposal assigned to said content in said assigning procedure or step);

a resource identifier identifying a resource or content respectively to that said at least one tag proposal has been assigned in said assigning procedure;

a date of assigning said at least one tag proposal;

a name of a user, who assigned said at least one tag proposal to said content; and a system identifier identifying a technical system for storage of said content.

Here, the technical system indicates an instance of a content management system like a wiki or blogging system or any other application with tagging functionalities. The system identifier can be used e.g. in procedure module 14_7 of FIG. 1 (see description provided below with regard to FIG. 1) to connect several independent or distributed applications.

In this way, a structured and well organized management of the proposed and subsequently assigned and actually used tags and, thus, of the whole vocabulary of tags used by and specific for the user is ensured.

The inventors also propose a computer program product comprising a code, the code being configured to implement and/or to perform the method introduced above and explained in more detail below.

According to an embodiment, the code is stored on a data carrier.

According to a further embodiment, a computer program product is configured to perform said method when the computer program product is executed by a processing unit like a processor, for example.

Further, the inventors propose a data carrier comprising said computer program product.

Furthermore, the inventors propose a system, said system comprising a tagging service module, said tagging service module being configured to generate tag proposals for tagging of a content by combining at least two tag proposing procedures in dependence of a work context of said user.

According to an embodiment, said tagging service module is configured to evaluate said work context of said user.

According to a further embodiment, said system comprises a semantic network module, said semantic network module being configured for storing of said tag assignments (i.e. assigned tag proposals) in a semantic network.

Further, according to an embodiment, said system comprises at least one tag proposing procedure module, said at least one tag proposing procedure module being configured to perform said at least one tag proposing procedure.

In this way, the proposal allows a flexible implementing of tagging, wherein a variety of tag proposing procedures can be involved into the tagging and no restrictions are made with regard to tag proposing procedures, which can be used.

Furthermore, the inventors propose an apparatus, said apparatus comprising the system introduced above and explained in more detail below. In particular, the apparatus is arranged such that it comprises the modules of the system introduced above and explained in more detail below and is configured to perform tagging by use of these modules.

Thus, there is an improved method of tagging. Additionally, performance of an apparatus or a system responsible for content management performed by use of tagging is improved considerably.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
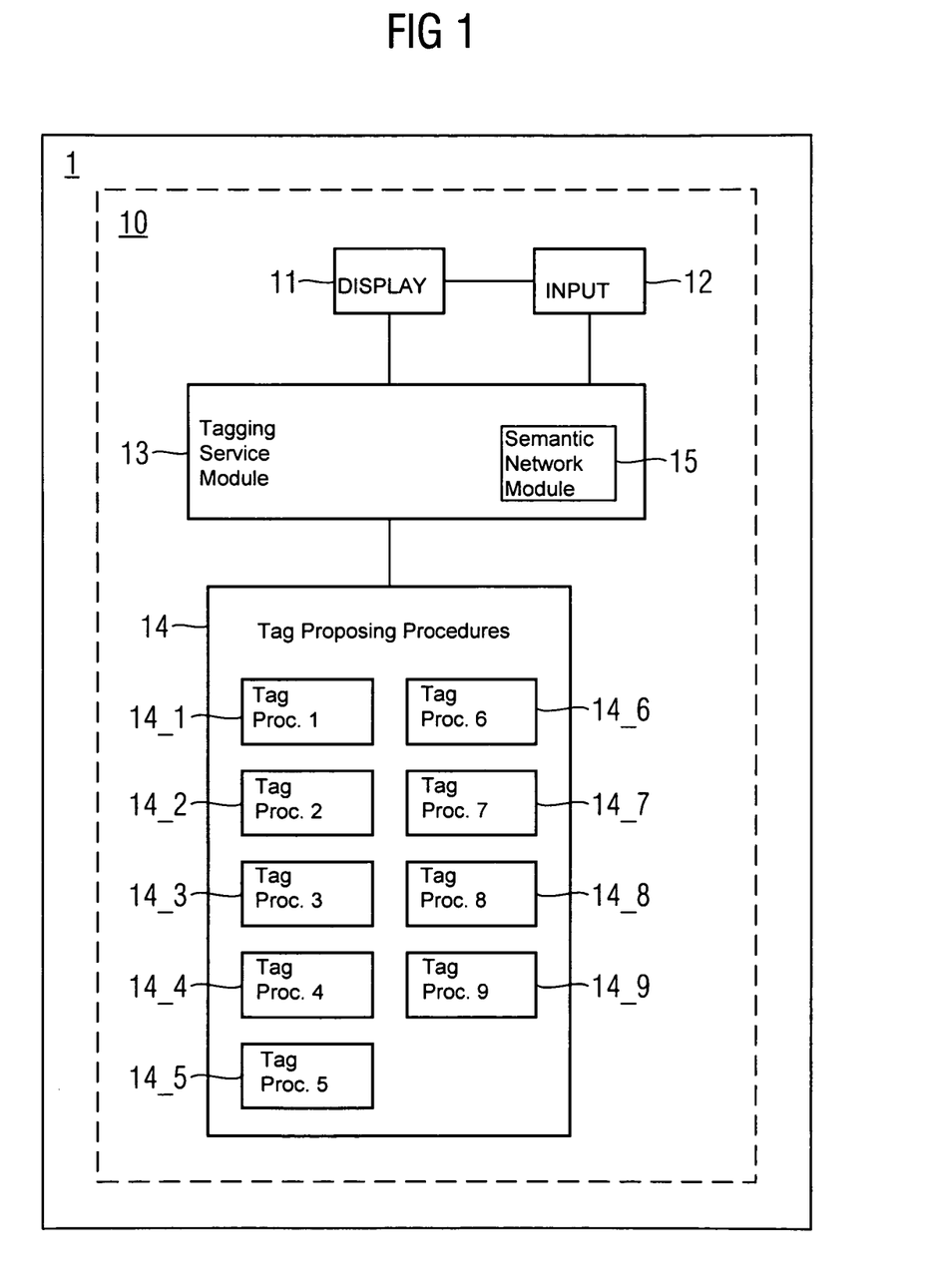
FIG. 1 shows an apparatus and a system configured for tagging according to one potential embodiment.

FIG. 1 shows an apparatus 1 and a system 10 configured for tagging according to an embodiment. According to the shown embodiment the apparatus 1 comprises the system 10 and, thus, the modules 11 to 15 of the system 10.

Here, it has to be noted that the present invention is not restricted to the present embodiment only. Thus, an apparatus configured for tagging and arranged according to an embodiment can comprise modules, configured to allow performing, without having the system; and a system configured for tagging and arranged according to and embodiment can be implemented over several apparatus, wherein the several apparatus will comprise at least one of the modules of the system, the modules being configured to allow performing.

Moreover, the modules can be configured to perform also further functions. Additionally, some of the modules can be arranged also into one module or their functionalities can be split over several modules, if necessary. Thus, the inventors' proposals allow several arrangements of apparatus, systems, and/or modules for performing of the tagging according to the present invention.

According to the present embodiment, the system 10 (and the apparatus 1) comprises a tagging service module 13, said tagging service module 13 being configured for generating of tag proposals by combining at least two tag proposing procedures in dependence of a work context of said user.

According to the present embodiment, the tag proposing procedures are performed by corresponding procedure modules 14_1, 14_2, 14_3, 14_4, 14_5, 14_6, 14_7, 14_8, and 14_9. Thus, each of the procedure modules 14_1, 14_2, 14_3, 14_4, 14_5, 14_6, 14_7, 14_8, and 14_9 is configured to perform at least one tag proposing procedure and to provide corresponding tag proposals.

According to the present embodiment, the following tag proposing procedures are performed by procedure modules 14_1, 14_2, 14_3, 14_4, 14_5, 14_6, 14_7, 14_8, and 14_9.

According to the present embodiment, the procedure module 14_1 is configured to perform a tag proposing procedure, according to which a thematical or topical context of already available, i.e., of already determined and/or assigned tags, is analyzed and evaluated. Then, those tags of this set of already determined and/or assigned i.e. of already available tags are proposed and provided by the tag proposing procedure of the procedure module 14_1, which have a semantic proximity with regard to the thematical or topical context of the corresponding content or part of the content, for which tags are searched, determined and/or assigned. The measuring of the semantic proximity can be performed, e.g., by calculating of the co-occurrence between the thematical or topical contexts of the corresponding content or part of the content and the already searched, determined and/or assigned i.e. already available tag.

Further, according to the present embodiment, the procedure module 14_2 is configured to perform a tag proposing procedure, according to which a thematical or topical context of the content or part of the content is analyzed and evaluated. Here, tags are proposed and provided by use of results of analysis of subject matter of the content or part of the content, in which topics of the content or of a part of the content are determined. In this way, such tags are proposed as tag proposals, which correspond to at least one topic similar to a topic of the content or of a part of the content.

Furthermore, according to the present embodiment, the procedure module 14_3 is configured to perform a tag proposing procedure, according to which tags are proposed with regard to a recent calculation or assignment of tags. In particular, by this tag proposing procedure such tags are determined, proposed, and provided, which have been assigned recently, e.g., during a certain number of last times in which tagging was performed or during a certain period of time. This tag proposing procedure can be performed by considering a whole set of predetermined and available tags or by considering a subset of tags selected from the whole set of tags.

According to the present embodiment, the procedure module 14_4 is configured to perform a tag proposing procedure, according to which a frequency value is assigned to each of the determined and available tags and according to which such tags are proposed and provided, which represent most frequently assigned tags. For selecting of most frequently assigned tags, also this procedure can be applied to a whole set of predetermined and available tags or to a sub-set of tags selected from the whole set of tags.

According to the present embodiment, the procedure module 14_5 is configured to perform a tag proposing procedure, according to which the tagging behaviour of the user is evaluated and according to which further tag proposing procedures are applied or performed only with regard to such determined and available tags, which represent tags used by the corresponding user.

According to the present embodiment, the procedure module 14_6 is configured to perform a tag proposing procedure, according to which analysis and evaluation of a social network of the user is performed for determining, proposing, and providing of tags. In particular, beside the tags used by the user itself also tags used in the social network of the user are taken when determining, proposing, and providing tags. Here, the social network represents a group or community of users to which the particular user has contact, e.g., through commonly performed projects, through commonly created contents, or through further common tasks by which certain contents are or have been created. When performing this tag proposing procedure, beside the tags used by the user itself also tags used by the further users, which have worked or are working with the user, are involved or used for determining and proposing of tags.

According to the present embodiment, the procedure module 14_7 is configured to perform a tag proposing procedure, according to which vocabularies of several independent or distributed applications with tagging functionalities are connected to unify the tags of the several applications provided in the corresponding vocabularies to a single set of tags. This approach has the advantage that a small vocabulary of tags of an application can be extended in this way.

According to the present embodiment, the procedure module 14_8 is configured to perform a tag proposing procedure, according to which a vocabulary or set of tags respectively is supplemented by editorially administrated terms and relations. The vocabulary or set of tags can be supplemented manually, without the need that the tags have to be assigned to certain contents previously. By use of an appropriate data model for managing of tags, specific relations can be established between the single tags of the vocabulary or the set of tags respectively, e.g., for synonyms or for generic and specific terms. When proposing tags, these specific relations can be offered or used additionally, e.g., to refine or to generalize the proposal of tags.

According to the present embodiment, the procedure module 14_9 is configured to perform a tag proposing procedure, according to which (standardized) ontologies or thesauri are used (e.g., additionally) for selecting of appropriate tags.

According to the present embodiment, the procedure modules 14_1 to 14_9 as introduced above can be comprised in a general procedure managing module 14.

It has to be noted, that the present invention is not restricted to the tag processing procedures described above. A variety of different tag processing procedures can be used and combined for tagging.

According to the present embodiment, the tagging service module 13 can be configured for evaluating of the work context of a user.

The different tag proposing procedures performed by the corresponding modules 14_1 to 14_9 are then selected and combined by considering the work context of the user. Additional benefit arises from a reasonable combining of different tag proposing procedures to an entire tag proposing procedure by the tagging service module 13. Such a reasonable combining is possible when taking into account the actual work context of the user.

A further additional benefit arises by use or adapting of the different tag proposing procedures with regard to different situations during the tagging process. For each of the different situations, the most appropriate combination of the different tag proposal procedures can be used and performed as a whole tag proposal procedure. In this way an optimal selecting of tags with regard to specific situations is possible by use.

In following, some examples of the different situations which can be encountered during the tagging process are described.

One situation during the tagging process arises by differentiating whether one or several initial characters (a prefix) of a term or tag, respectively, have been inputted or whether no input of a new tag has been performed currently. If a prefix of a tag or term has been provided, a filtering or search for tag proposals comprising tags with the corresponding prefix can be started. In this way, a forward-typing can be realized. If no prefix has been inputted, the tag proposing procedures as described above can be used to provide tag proposals.

In another situation, it can be differentiated whether a first tag is selected from a proposed set of tags or inserted or whether at least one further tag has already been selected from the proposed set of tags or inserted. If at least one further tag has already been selected or inserted, the thematical or topical context will become more important when selecting or inserting additional tags. In this case, the tag proposing procedure provided by module 14_1 can represent one of the most suitable procedures for proposing tags. If no tag has been selected, assigned, and/or inserted, tag proposing procedures provided and performed by modules 14_2 to 14_4 will represent more suitable candidates for performing of tagging.

In another situation, the choice of appropriate tag providing procedures provided by modules 14_1 to 14_9 can depend on results of the corresponding tag providing procedures. For example, if by considering the tagging behaviour of the user not enough tags are provided (here the tag providing procedure of the module 14_5 has been performed), the determining of further tag proposals can be performed, e.g., step by step by considering the social environment or network of the user and, thus, by performing the tag providing procedure of module 14_6. Thus, if one tag providing procedure or if one set of tag providing procedures does not provide enough tag proposals, depending on the actual situation further appropriate tag providing procedures can be performed additionally to provide a sufficient number of tag proposals.

Thus the tagging service module 13 is configured to select at least one appropriate tag proposing procedure to provide tag proposals. If the results provided of the at least one appropriate tag proposing procedure are insufficient, the tagging service module is configured to select at least one further appropriate tag proposing procedure to provide tag proposals. In both cases, the tag proposing procedures are selected in dependence on the current situation, i.e., on the work context of the user.

The tagging service module 13 comprises at least one corresponding interface to the different tag proposing procedures and, thus, to modules 14_1 to 14_9. Exchange of data between the tagging service module 13 and the procedure modules 14_1 to 14_9 is indicated in FIG. 1 by a line connecting the tagging service module 13 and the procedure managing module 14. The tagging service module 13 is configured to evaluate the work context of a user and in dependence on the evaluated work context to choose the appropriate combination of tag proposing procedures, and subsequently to request the corresponding tag proposing procedures, implemented in the procedure modules 14_1 to 14_9 and used by the at least one interface to determine appropriate tag proposals. After the requested tag proposing procedures, implemented by the procedure modules 14_1 to 14_9 and used in combination, have determined appropriate tag proposals, the tagging service module 13 receives the determined tag proposals from the corresponding tag proposing procedures and, thus, the procedure modules 14_1 to 14_9.

According to the present embodiment, the general managing module 14 can receive the requests from the tagging service module 13, transmit the requests to the corresponding procedure modules 14_1 to 14_9 and, thus, to the corresponding tag proposing procedures. Further, the general managing module 14 can be configured to receive the determined tag proposals from the corresponding tag proposing procedures and, thus, the procedure modules 14_1 to 14_9 and to reach or transmit them to the tagging service module 13, i.e., to the at least one interface of the tagging service module 13.

Here, several implementations are allowed. Both direct connecting between the tagging service module 13 and the procedure modules 14_1 to 14_9 and an indirect connecting of the tagging service module 13 with the procedure modules 14_1 to 14_9 through the general procedure managing module 14 are possible, for example.

Data comprising proposed and/or determined tags can be stored in a memory of the tagging service module 13. According to the present embodiment, the data are modelled and stored in a semantic network comprised and managed by a semantic network module 15.

According to the present embodiment, the semantic network module 15 can form part of in the tagging service module 13. However, the semantic network module 15 can also be placed outside the tagging service module 13. In the latter case a corresponding connection can be established between the both modules 13 and 15 to exchange data (e.g., by use of corresponding interfaces).

The data stored in the semantic network of the semantic network module 15 can comprise, for example, the following attributes for determined, proposed, and assigned tags, i.e., tag proposals, which actually have been assigned to a content:

the tag, i.e., the tag proposal (indicating a term or key word, respectively, assigned to a content);

a resource identifier (e.g., an URL) identifying a resource of the corresponding tag by use of which said tag has been detected;

a date of assigning of the corresponding tag;

data concerning the user, who assigned the corresponding tag, e.g., the name of a user; and/or a system identifier identifying a technical system for storage of the content, to which the corresponding tag or tag proposal respectively has been assigned.

Thus, according to the present embodiment the semantic network module 15 is configured to store the determined and/or proposed tags (tag proposals) assigned to a content in the semantic network by use of the above indicated attributes. It has to be noted that several arrangements of attributes are allowed and that the present invention is not restricted to the attributes as provided above exemplary only. The attributes can be chosen based on area or environment, with regard to which tagging is implemented.

The semantic network can be implemented by use of known tools like RDF, RDFS, OWL, SPARQL, Jena, Sesame, etc., for example.

Further, according to the embodiment shown in FIG. 1 the system 10 and, thus, the apparatus 1 comprises a displaying module 11 configured for visualizing or displaying the tag proposals. The tagging service module 13 can supply tag proposals to the displaying module 11 directly after receiving them from the tag proposing procedures or procedure modules 14_1 to 14_9 respectively or, if the tag proposals, which have been assigned to a content, are stored in the semantic network or semantic network module 15 respectively, after retrieving and assigning the tag proposals from the semantic network or semantic network module 15 respectively.

Additionally, the system 10 and, thus, the apparatus 1 comprises an input module 12 configured to provide data concerning inputted tags or inputted parts of tags to the tagging service module 13. Further, the data concerning inputted tags or inputted parts of tags can be provided by the input module 12 to the displaying module 11 and can be visualized or displayed by the displaying module 11.

The tagging service module 13 can be configured to use inputted tags or inputted parts of tags for generating tag proposals and/or for evaluating of the work context of the user as exemplary described above.

Figure 2:
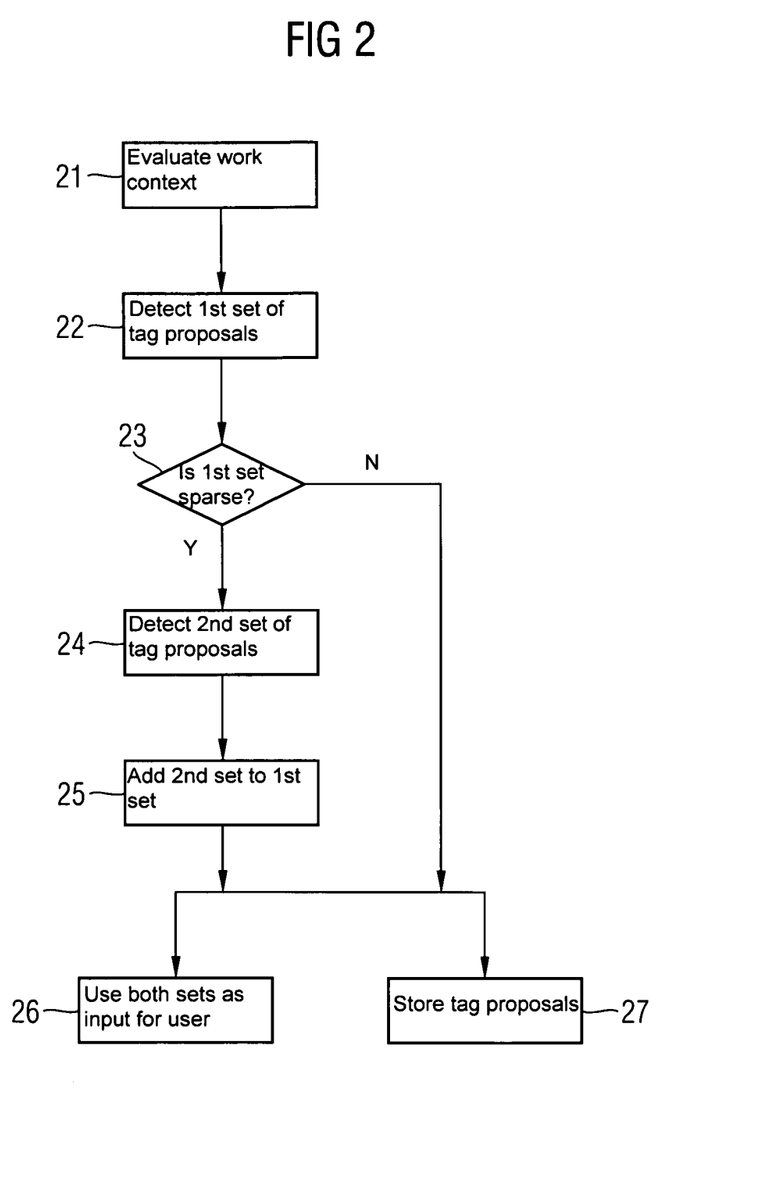
FIG. 2 shows a diagram visualizing steps of a method configured to perform tagging according to an embodiment.

FIG. 2 shows a diagram visualizing steps of a method configured to perform a tagging according to an embodiment. In general, the method comprises generating of tag proposals by combining at least two tag proposing procedures in dependence of a work context of a user, to which input support is provided by proposing tags if the user intends to add or assign tags to a content for an improved content management. Essentially, the method is performed by the tagging service module 13 of FIG. 1 explained above.

In step 21, the work context of the user is evaluated. Then, in step 22, based on the evaluated work context tag proposing procedures (at least one tag proposing procedure) are detected, which can provide the most appropriate tag proposals with regard to the evaluated work context of the user. Further, in step 22, a first set of tag proposals is detected by use of the detected or predetermined set of tag proposing procedures. The tag proposing procedures can be performed in a combined way. Thus, for example, one tag proposing procedure can use results of another tag proposing procedure to provide tag proposals etc. Several ways of combining of the detected or predetermined tag proposing procedures are possible. The way of combining is chosen or selected by taking into account working principles of the tag proposing procedures and the evaluated work context of the user.

In step 23, it is checked whether the first set of tag proposals is a sparse set of tag proposals. Thus, it is checked whether enough tag proposals have been provided by the detected or predetermined set of tag proposing procedures. Threshold values can be used, for example, in checking step 23, wherein the size of the first set can be compared with a threshold value. If the size of the first set is smaller than the threshold value, the first set of tag proposals represents a sparse set of tag proposals. However, several appropriate ways of checking are possible. We are not restricted to this example.

If the first set of tag proposals is a sparse set of tag proposals, in step 24, a second set of tag proposals is detected by use of at least one further tag proposing procedure, which is not included in the predetermined set of tag proposing procedures.

In step 24, at least one further tag proposing procedure is chosen or detected in dependence of the work context of the user. The work context of the user can be the work context evaluated in step 21; however, also anew evaluation of the work context can be performed in step 24.

If more than one further tag proposing procedure is chosen or detected as appropriate for proposing of tags, a combining of the further tag proposing procedures as described above can be performed to derive the desired second set of tag proposals.

Finally, the tag proposals of the second set of tag proposals are added to the first set of tag proposals in step 25. The tagging method proceeds then with step 26.

If the first set of tag proposals does not represent a sparse set of tag proposals, the process continues with step 26.

In step 26, the first set of tag proposals is provided for tagging of a content and is used as input support for the user. Thus, it can be visualized or displayed to the user to enable the user to select best fitting tags and to assign them to the content. Here, within the scope of the tagging at least one tag proposal of the first set of tag proposals is assigned to a content.

In step 27, the at least one tag proposal of the first set of tag proposals, which has been assigned to a content, can be stored. According to the present embodiment, the assigned tag proposals, i.e., the at least one tag proposal are/is stored in a semantic network, as explained exemplary above.

Figure 3:
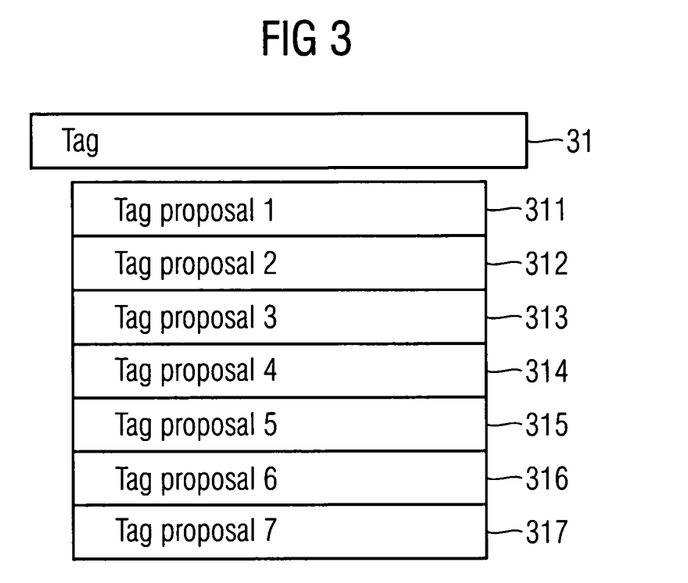
FIG. 3 shows visualizing of tag proposals according to an embodiment.

FIG. 3 shows visualizing of tag proposals 311 to 317 according to an embodiment, wherein one of the tag proposals 311 to 317 can be selected as a tag 31 and assigned to a content. In particular, in FIG. 3 the tag proposals 311 to 317 are visualized as a list, which can show seven entries (i.e., seven tag proposals) at the same time. According to the present embodiment, the rows or slots of the list are filed in a predetermined way, wherein a certain number of rows or slots comprises tag proposals provided by one certain tag proposing procedure and a further subsequent number of rows or slots comprises tag proposals provided by a further certain tag proposing procedure. Thus, for example, the first four tag proposals 311 to 314 can be tag proposals determined by use of the tag proposing procedure of the module 14_1 and the three subsequent tag proposals 315 to 317 can be tag proposals determined by use of the tag proposing procedure of the module 14_2. If one of the tag proposing procedures provides less tag proposals than number of rows or slots reserved in the list for the corresponding tag proposing procedure, the free rows or slots can be filled with tag proposals provided by a further tag proposing procedure.

Furthermore, a ranking of the tag proposing procedures can be performed with regard to the work context of the user. Thus, tag proposing procedures which are determined and assessed as being more appropriate for proposing of tags with regard to the work context of the user will get a higher ranking. In this case, the list will be configured such that tag proposals provided by tag proposing procedures with higher ranking are shown first in the list.

Figure 4:
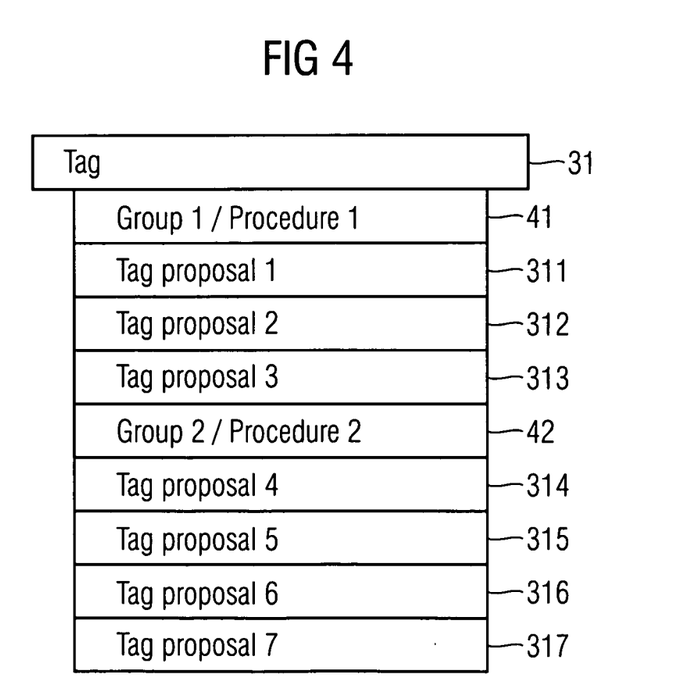
FIG. 4 shows visualizing of tag proposals according to an embodiment.

FIG. 4 shows visualizing or display of tag proposals 311 to 317 according to an embodiment, wherein one of the tag proposals 311 to 317 can be selected as a tag 31 and assigned to a content. Also in FIG. 4, the tag proposals 311 to 317 are visualized as a list, wherein according to FIG. 4 a grouped visualizing of the tag proposals is performed. In particular, the list comprises rows 41, 42, by which the origin or a certain characteristic of tag proposals represented in subsequent rows is indicated explicitly.

According to the present embodiment, the row 41 indicates that the subsequent tag proposals 311 to 313 are derived by use of the tag proposing procedure "Procedure 1", and the row 42 indicates that the subsequent tag proposals 314 to 317 are derived by use of the tag proposing procedure "Procedure 2". Here, more than two groups are possible if adequate.

Thus, the user becomes aware of characteristics of tags proposed.

Figure 5:
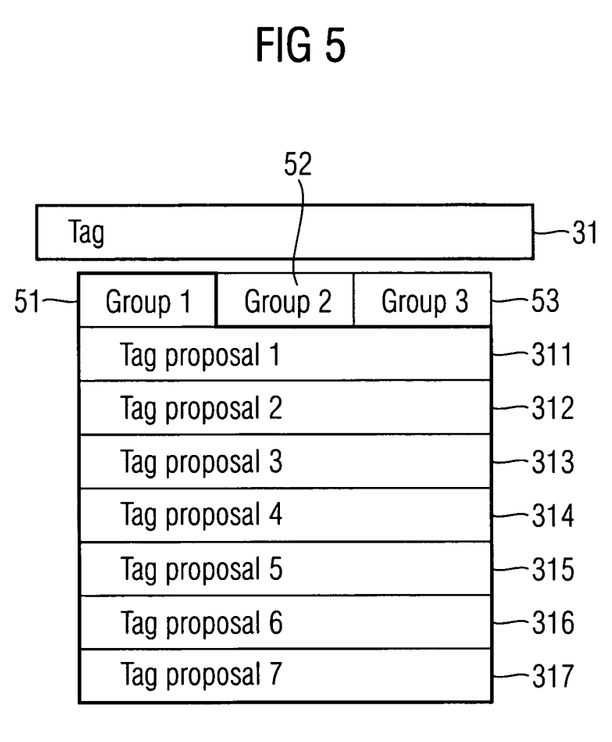
FIG. 5 shows visualizing of tag proposals according to an embodiment.

FIG. 5 shows visualizing of tag proposals 311 to 317 according to an embodiment, wherein one of the tag proposals 311 to 317 can be selected as a tag 31 and assigned to a content. According to the embodiment of FIG. 5, the tag proposals 311 to 317 are visualized by use of crystal tabs. According to the present embodiment the tag proposals are grouped with regard to at least two groups 51, 52, 53, wherein each of the groups is visualized by use of one tab. Here, the tag proposals 311 to 317 belong to the group 51.

Figure 6:
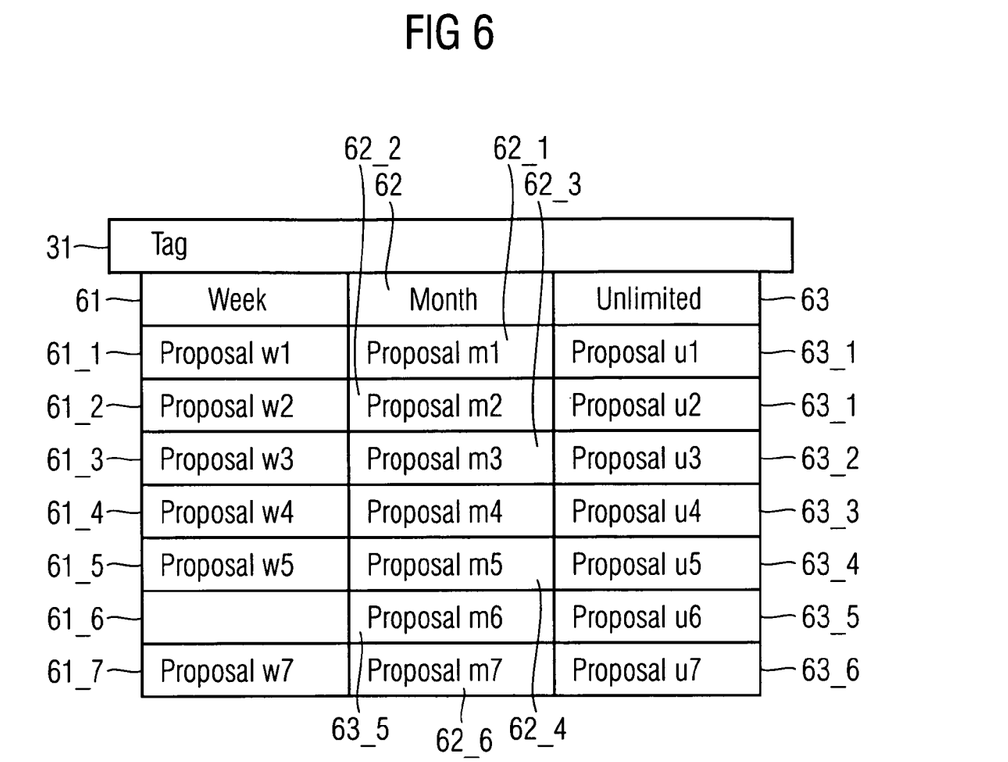
FIG. 6 shows visualizing of tag proposals according to an embodiment.

FIG. 6 shows visualizing of tag proposals 61_1 to 61_7, 62_1 to 62_7, and 63_1 to 63_7 according to an embodiment, wherein one of the tag proposals 61_1 to 61_7, 62_1 to 62_7, and 63_1 to 63_7 can be selected as a tag 31 and assigned to a content. In particular, according to the present embodiment the tag proposals 61_1 to 61_7, 62_1 to 62_7, and 63_1 to 63_7 are visualized by use of a matrix representation, wherein columns of the matrix represent groups 61, 62, 63 of the tags. According to the present embodiment, the tag proposals 61_1 to 61_7, 62_1 to 62_7, and 63_1 to 63_7 are grouped with regard to time or recent use. The column representing the group "Week" 61 shows tag proposals 61_1 to 61_7, which have been assigned during the last week. The column representing the group "Month" 62 shows tag proposals 62_1 to 62_7, which have been assigned during the last month. The column representing the group "Unlimited" 63, in turn, shows tag proposals 63_1 to 63_7, which have been assigned within a time period which is more than one month ago.

Thus, several ways of displaying or visualizing of tags detected and proposed are enabled.

Summarizing, the tagging method refers to generating of tag proposals for tagging of a content, wherein the generating of said tag proposals is performed by combining at least two tag proposing procedures in dependence of a work context of a user. The method can be applied with regard to each area where tagging of contents is desired. By use an effective, computing resource saving, and/or flexible tagging is enabled, by which a sufficient number of tags with high quality can be identified.

While embodiments and applications have been shown and described above, it should be apparent to those skilled in the art, that many more modifications (than mentioned above) are possible without departing from the concept described herein. The invention, therefore, is not restricted except in the spirit of the appending claims. Therefore, it is intended that the foregoing detailed description should be regarded as illustrative rather than limiting.

Thus, for example, the modules of the system or of the apparatus respectively can be software and/or hardware modules. Furthermore, also the system can be a software and/or hardware system. Moreover, several tag proposing procedures can be used. The method is not restricted to tag proposing procedures as described by way of example above. Further, the modules used for performing can be arranged in several ways. Moreover, the method allows also other ways of displaying or visualizing of tag proposals. It has to be pointed out, that further modifications, not mentioned here, are possible within the scope as claimed and described.

The embodiments can be implemented in computing hardware (computing apparatus) and/or software, such as (in a non-limiting example) any computer that can store, retrieve, process and/or output data and/or communicate with other computers. The processes can also be distributed via, for example, downloading over a network such as the Internet. The results produced can be output to a display device, printer, readily accessible memory or another computer on a network. A program/software implementing the embodiments may be recorded on computer-readable media comprising computer-readable recording media. The program/software implementing the embodiments may also be transmitted over a transmission communication media such as a carrier wave. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v DIRECTV, 69 USPQ2d 1865 (Fed. Cir. 2004).

What is claimed is:

1. A method of generating of tag proposals used for tagging of a content, comprising:
   detecting a first set of tag proposals by use of a predetermined set of tag proposing procedures;
   deriving a second set of tag proposals using a plurality of further tag proposing procedures for content having the first set of tag of tag proposals detected, the second set of tag proposals being different than the predetermined set of tag proposing procedures used for detecting the first set of tag proposals, and the second set of tag proposals being selected to be combined with the first set of tag proposals in dependence of a work context of a user;
   adding the second set of tag proposals to the first set of tag proposals to form a combined set of tag proposals; and
   providing the combined set of tag proposals as the tag proposals for tagging of a content, where the combined set of the tag proposals are selected to adapt to different situations including based on evaluation of the detecting during a tagging process.

2. The method according to claim 1, the method further comprising evaluating of the work context of the user.

3. The method according to claim 1, wherein the predetermined set of tag proposing procedures is determined in dependence of the work context of the user.

4. The method according to claim 1, wherein the plurality of further tag proposing procedures are selected in dependence of the work context of the user.

5. The method according to claim 1, further comprising assigning of at least one tag proposal of the tag proposals to the content and storing of the at least one tag proposal, assigned to the content, in a semantic network.

6. The method according to claim 5, wherein storing of the at least one tag proposal comprises storing a tag corresponding to the tag proposal and storing at least one of:
   a resource identifier identifying the content to which the at least one tag proposal has been assigned;
   a date on which the at least one tag proposal was assigned;
   a name of the user-assigned the at least one tag proposal; and
   a system identifier identifying a technical system for storage of the content.

7. The method according to claim 2, the generating of tag proposals comprising:
   detecting a first set of tag proposals by use of a predetermined set of tag proposing procedures; and if and only if the first set of tag proposals is a sparse set of tag proposals:
    detecting a second set of tag proposals by use of at least one further tag proposing procedure, which is not comprised in the predetermined set of tag proposing procedures;
    adding the second set of tag proposals to the first set of tag proposals to form a combined set of tag proposals; and
    providing of the combined set of tag proposals as the tag proposals for tagging of the content.

8. The method according to claim 7, wherein the predetermined set of tag proposing procedures is determined in dependence of the work context of the user.

9. The method according to claim 7, wherein the at least one further tag proposing procedure is selected in dependence of the work context of the user.

10. A non-transitory computer readable storage medium storing a computer program which when executed on a computer causes the computer to perform a method of generating tag proposals for tagging of a content, the method comprising:
    detecting a first set of tag proposals by use of a predetermined set of tag proposing procedures;
    deriving a second set of tag proposals using a plurality of further tag proposing procedures for content having the first set of tag of tag proposals detected, the second set of tag proposals being different than the predetermined set of tag proposing procedures used for detecting the first set of tag proposals, and the second set of tag proposals being selected to be combined with the first set of tag proposals in dependence of a work context of a user;
    adding the second set of tag proposals to the first set of tag proposals to form a combined set of tag proposals; and
    providing the combined set of tag proposals as the tag proposals for tagging of a content, where the combined set of the tag proposals are selected to adapt to different situations including based on evaluation of the detecting during a tagging process.

11. A system comprising:
    a tagging service computer processor to detect a first set of tag proposals by use of a predetermined set of tag proposing procedures,
    to derive a second set of tag proposals using a plurality of further tag proposing procedures for content having the first set of tag of tag proposals detected, the second set of tag proposals being different than the predetermined set of tag proposing procedures used for detecting the first set of tag proposals, the second set of tag proposals being selected to be combined with the first set of tag proposals in dependence of a work context of a user,
    to add the second set of tag proposals to the first set of tag proposals to form a combined set of tag proposals, and
    to provide the combined set of tag proposals as the tag proposals for tagging of a content, where the combined set of the tag proposals are selected to adapt to different situations including based on evaluation of the detecting during a tagging process.

12. The system according to claim 11, wherein the tagging service computer processor is configured to evaluate the work context of the user.

13. The system according to claim 12, wherein
    the tag proposals are assigned to content, and
    the system further comprises a semantic network module to store the tag proposals in a semantic network.

14. The system according to claim 11, further comprising at least one tag proposing procedure module to identify tag proposals using the at least two tag proposing procedures.

* * * * *